US012644795B1

(12) United States Patent
Khmelev et al.

(10) Patent No.: US 12,644,795 B1
(45) Date of Patent: Jun. 2, 2026

(54) VEHICLE INSPECTIONS WITH MACHINE LEARNING

(71) Applicant: UIPCO, LLC, San Antonio, TX (US)

(72) Inventors: Yevgeniy Viatcheslavovich Khmelev, San Antonio, TX (US); Kevin McAdams, Boerne, TX (US); Brennen Michael Ricks, San Antonio, TX (US); Nina Schuessler, San Antonio, TX (US); Andre Rene Buentello, San Antonio, TX (US); Dena Gazin, Seattle, WA (US); Crystal Brooke Goforth, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 121 days.

(21) Appl. No.: 18/344,111

(22) Filed: Jun. 29, 2023

Related U.S. Application Data

(60) Provisional application No. 63/357,081, filed on Jun. 30, 2022.

(51) Int. Cl.
  *G01M 17/00* (2006.01)
  *G07C 5/00* (2006.01)
  *G07C 5/08* (2006.01)
(52) U.S. Cl.
  CPC ............. *G01M 17/00* (2013.01); *G07C 5/008* (2013.01); *G07C 5/0808* (2013.01)

(58) Field of Classification Search
  CPC ...... G01M 17/00; G07C 5/008; G07C 5/0808
  See application file for complete search history.

(56) References Cited

U.S. PATENT DOCUMENTS

| | | | | |
|---|---|---|---|---|
| 9,832,429 | B2 * | 11/2017 | Seymour | ................ H04N 7/181 |
| 9,894,492 | B1 * | 2/2018 | Elangovan | ............ H04W 4/023 |
| 10,534,968 | B1 * | 1/2020 | Clauss | .................... G06F 18/22 |
| 11,313,765 | B2 * | 4/2022 | Onekea | ............. H04N 5/44504 |
| 11,893,836 | B1 * | 2/2024 | Knas | ........................ G06F 3/167 |
| 12,120,526 | B2 * | 10/2024 | McCallen | ............. H04W 12/64 |
| 2015/0087264 | A1 * | 3/2015 | Goyal | ................... H04W 4/027 |
| | | | | 455/411 |
| 2020/0151974 | A1 * | 5/2020 | Ghosh | ................... G07C 5/0866 |
| 2021/0124961 | A1 * | 4/2021 | Simoncini | ............. G06N 20/20 |
| 2022/0392282 | A1 * | 12/2022 | Schmidt | ............... G05D 1/0088 |
| 2024/0071108 | A1 * | 2/2024 | Edwards | ................ G06V 40/20 |

FOREIGN PATENT DOCUMENTS

| | | | | |
|---|---|---|---|---|
| WO | WO-2023007139 A1 * | 2/2023 | ........... G07C 5/0816 |

* cited by examiner

*Primary Examiner* — Kito R Robinson
*Assistant Examiner* — Alexander V Gentile
(74) *Attorney, Agent, or Firm* — Plumsea Law Group, LLC

(57) ABSTRACT

Systems and methods for inspecting one or more vehicle systems, may be used with vehicles including a brake system and vehicle lights. The systems and methods utilize an application that can run on a user's device (such as a phone), which can automatically gather data in real time to assess the operation of various vehicle systems. The systems and methods further leverage machine learning to analyze data gathered by the device's sensors.

20 Claims, 8 Drawing Sheets

500

LABELED TRAINING
DATA FROM
HISTORICAL
VEHICLE
INSPECTIONS
504

506

POSITION,
VELOCITY,
ACCELERATION,
BRAKE EVENT
DATA

BRAKE
INSPECTION
NEURAL
NETWORK

508

INSPECTION
STATUS

502

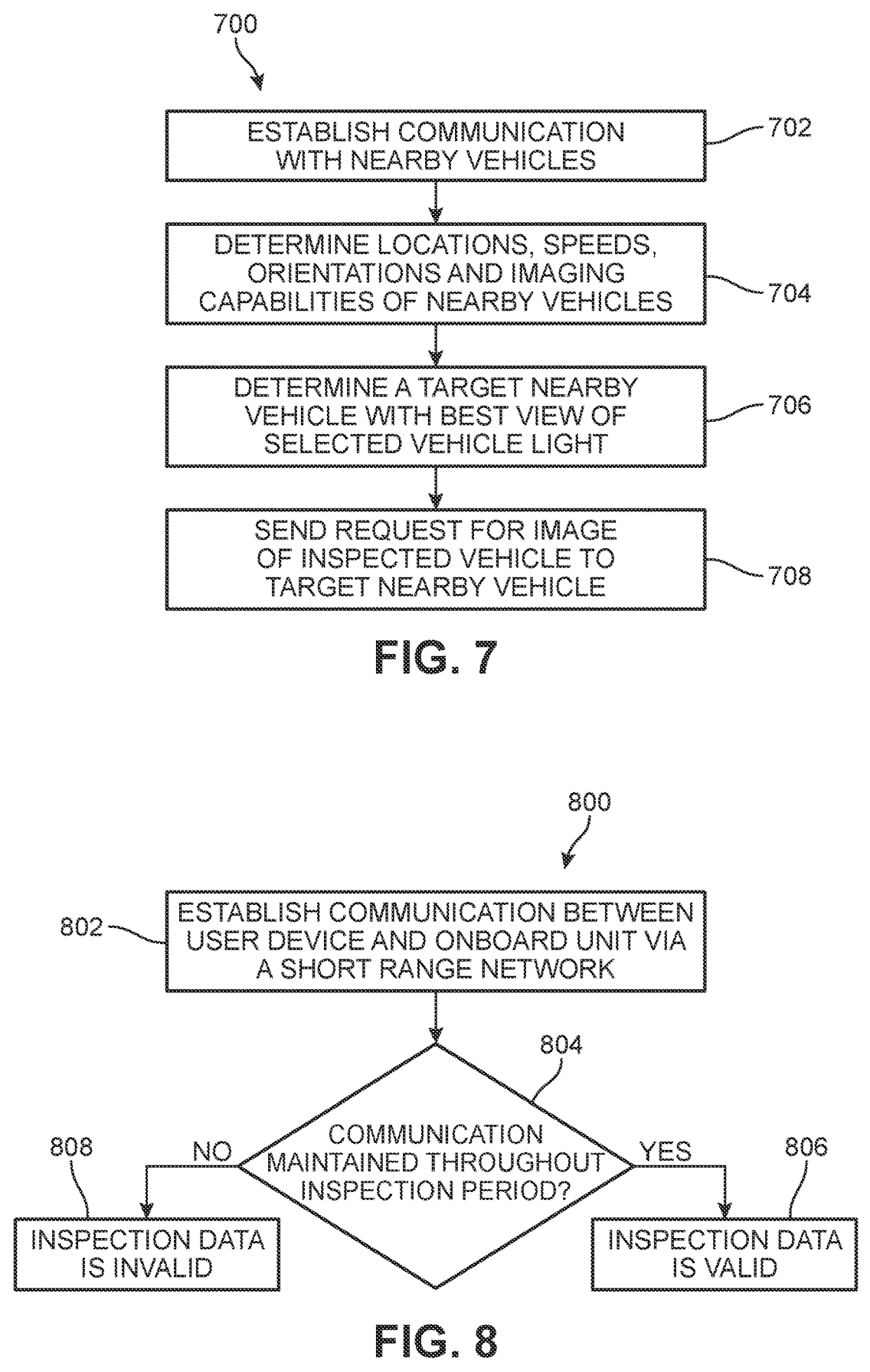

700

ESTABLISH COMMUNICATION
WITH NEARBY VEHICLES                                    702

DETERMINE LOCATIONS, SPEEDS,
ORIENTATIONS AND IMAGING
CAPABILITIES OF NEARBY VEHICLES                         704

DETERMINE A TARGET NEARBY
VEHICLE WITH BEST VIEW OF
SELECTED VEHICLE LIGHT                                  706

SEND REQUEST FOR IMAGE
OF INSPECTED VEHICLE TO
TARGET NEARBY VEHICLE                                   708

802   ESTABLISH COMMUNICATION BETWEEN
      USER DEVICE AND ONBOARD UNIT VIA
      A SHORT RANGE NETWORK

804

808              COMMUNICATION
NO        MAINTAINED THROUGHOUT        YES            806
          INSPECTION PERIOD?

INSPECTION DATA                          INSPECTION DATA
IS INVALID                               IS VALID

FIG. 8

VEHICLE INSPECTIONS WITH MACHINE LEARNING

CROSS-REFERENCE TO RELATED APPLICATIONS

This application claims the benefit of Provisional Patent Application No. 63/357,081 filed Jun. 30, 2022, and titled "Vehicle Inspections with Machine Learning," which is incorporated by reference herein in its entirety.

TECHNICAL FIELD

The present disclosure generally relates to systems and methods for inspecting motor vehicles, and in particular to using machine learning systems to inspect motor vehicles.

BACKGROUND

Many states require vehicles to undergo regular vehicle safety inspections. During the inspection, various vehicle systems are tested, such as the steering system, the braking system, the suspension system, the wheels, the tires, the fuel system, the exhaust system, the electrical system, and the vehicle lights. A brake system inspection may include checking various brake system parts and testing the vehicle's stopping distance. To test the vehicle's stopping distance, the vehicle may be driven at a predetermined velocity and the brakes applied. The total distance the vehicle travels before coming to a stop is recorded as the stopping distance. All exterior vehicle lights may also be inspected for compliance and to ensure they are operating correctly.

While vehicle inspections help ensure that vehicles driving on the road are operating safely, the process of getting a vehicle inspected can be inconvenient. Drivers have to take their vehicle to a certified location, which may be far away from their home, or only open at certain inconvenient times. Moreover, vehicle inspections are provided by a variety of different third parties, which can lead to inconsistent inspection results across those different parties. Additionally, the results of various tests may depend on environmental conditions, which may be variable across different geographic regions as well as time of year. For example, a vehicle's stopping distance may be dependent on the type and condition of the road where the test is performed and weather (if the road is wet or slick).

Other components of a vehicle inspection may be highly time consuming, such as requiring that an inspector observe the operation of each different vehicle light.

There is a need in the art for a system and method that addresses the shortcomings discussed above.

SUMMARY

In one aspect, a method of inspecting brakes in a motor vehicle using an application running on a mobile device includes steps of: confirming, throughout a safety inspection period, that the mobile device is disposed within the motor vehicle; receiving, during the safety inspection period, continuous GPS data from a GPS receiver within the mobile device and calculating continuous velocity data from the GPS data; receiving, during the safety inspection period, acceleration data from an accelerometer of the mobile device; and analyzing, using a machine learning model, the continuous velocity data and the acceleration data to determine a braking safety inspection result.

In another aspect, a method of inspecting lights in a motor vehicle using an application running on a mobile device includes steps of: receiving a selected vehicle light from a set of vehicle lights; confirming, throughout a safety inspection period, that the mobile device is disposed within the motor vehicle; sending a message to a remote system in a remote vehicle during the safety inspection period, wherein the message requests an image of the motor vehicle including the selected vehicle light; receiving, during the safety inspection period, the requested image of the motor vehicle from the remote system in the remote vehicle; and analyzing the requested image using object recognition to identify the selected vehicle light of the motor vehicle. If the selected vehicle light is identified, the method further includes determining if the selected vehicle light can be illuminated.

In another aspect, a system for inspecting lights in a motor vehicle using an application running on a mobile device includes a processor and non-transitory computer-readable media for storing instructions. The instructions are executable by the processor to: receive a selected vehicle light from a set of vehicle lights; confirm, throughout a safety inspection period, that the mobile device is disposed within the motor vehicle; send a message to a remote system in a remote vehicle during the safety inspection period, wherein the message requests an image of the motor vehicle including the selected vehicle light; receive, during the safety inspection period, the requested image of the motor vehicle; and analyze the requested image using object recognition to identify the selected vehicle light of the motor vehicle, wherein if the selected vehicle light is identified, the instructions are further executable to determine if the selected vehicle light can be illuminated.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a schematic view of a process for obtaining images of an inspected vehicle from nearby vehicles, according to an embodiment;

FIG. 8 is a schematic view of a method of validating data for an inspection, according to an embodiment.

DESCRIPTION OF THE EMBODIMENTS

The embodiments provide systems and methods for inspecting one or more vehicle systems, including a brake system and vehicle lights. The systems and methods utilize an application that can run on a user's device (such as a phone), which can automatically gather data in real time to assess the operation of various vehicle systems. The systems and methods further leverage machine learning to analyze data gathered by the device's sensors and/or by sensors associated with other systems (such as remote vehicles). In particular, machine learning systems, including neural networks, can be trained to analyze acceleration, velocity, position, and/or brake event data collected during a brake inspection period. Based on the input data, the machine learning system can predict a brake system inspection result (such as PASS or FAIL). By contrast with conventional brake tests that check for stopping distance in a one-off test, the exemplary systems and methods provide a more statistically robust test result as the acceleration, velocity, and brake event data can be analyzed over any suitable period, including data for multiple different brake events, and can analyze the behavior of the vehicle when the brakes are applied in realistic settings, as opposed to conditions on a test track.

The exemplary systems and methods can also leverage computer vision models to identify vehicle lights within captured images of the vehicle being inspected. These models can further analyze pixels associated with the identified vehicle lights and determine if the associated vehicle light is operating correctly. Moreover, to obtain images of the inspected vehicle while it is operating (driving), the systems and methods leverage communication with nearby vehicles, which can capture images of the vehicle and pass those images to the application running on a user's device within the inspected vehicle.

To protect against fraud that might occur if a bad actor attempts to fool the system by, for example, capturing data on their phone while riding in a different vehicle (not the vehicle to be inspected), the systems and methods also provide ways to ensure the user device running the inspection application is co-located with the inspected vehicle.

Figure 1:
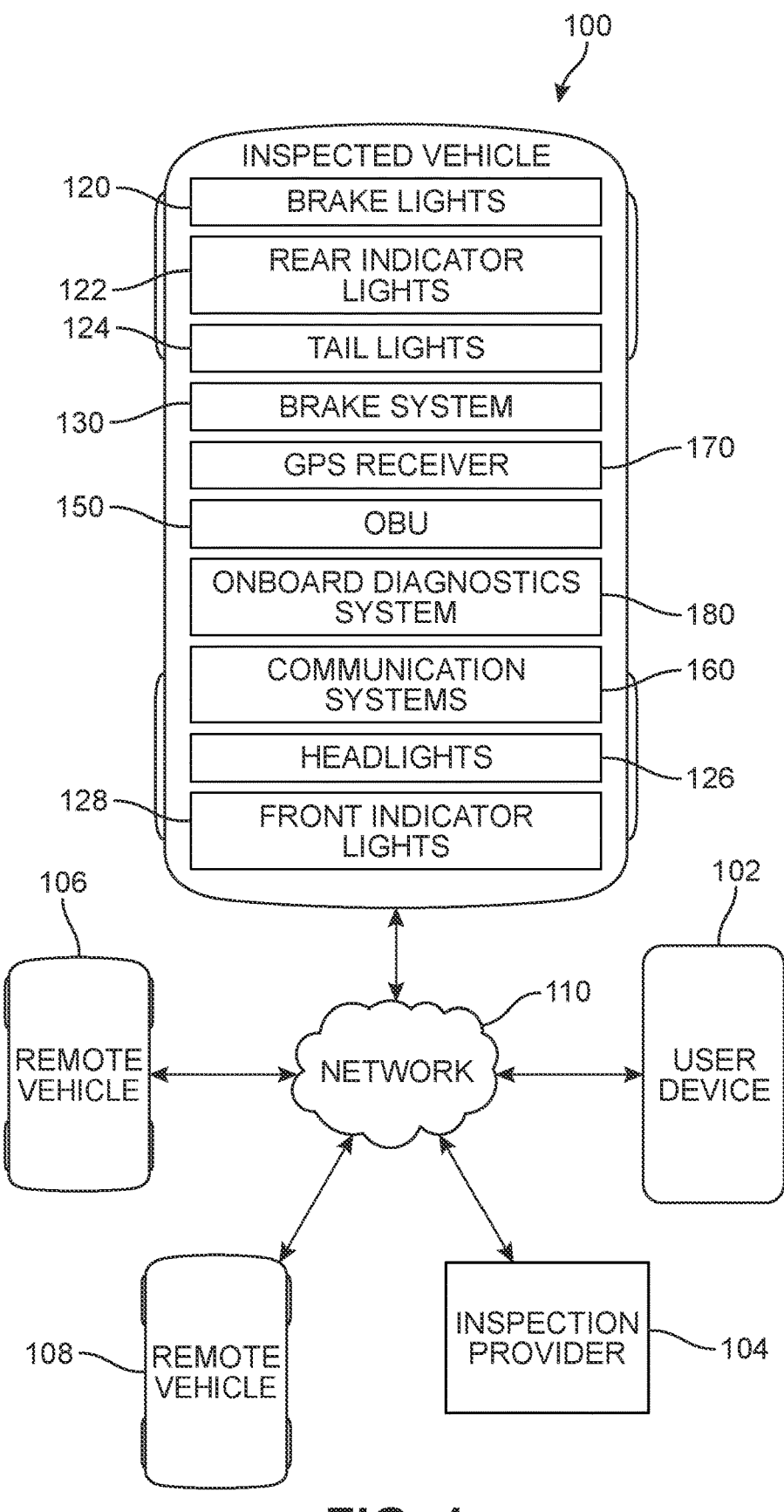
FIG. 1 is a schematic view of various components that may be used to facilitate a vehicle inspection, according to an embodiment.

FIG. 1 is a schematic view of components associated with one or more processes for inspecting one or more systems of a vehicle. These components include an inspected vehicle 100 (referred to simply as "vehicle 100"), a user device 102 ("device 102"), a first remote vehicle 106, a second remote vehicle 108, and an inspection provider 104.

Inspection provider 104 may be associated with any entities that directly or indirectly carry out or otherwise process vehicle inspections. In some cases, inspection provider 104 could be a government organization. In other cases, inspection provider 104 could be a private company. In some states, for example, the state government provides licenses to commercial operators who can test motor vehicles on behalf of the state.

Vehicle 100 may be a vehicle requiring an inspection. Vehicle 100 may be operated or otherwise owned by a user having user device 102.

Vehicle 100 may be associated with various vehicle systems and components. These can include one or more vehicle lights, including, but not limited to, brake lights 120, rear indicator lights 122, taillights 124, headlights 126, and front indicator lights 128. Although not shown, vehicle 100 can also include additional lights such as fog lights and/or other auxiliary lights.

Vehicle 100 can also include other vehicle systems, such as brake system 130. Brake system 130 can comprise any components for the operation and/or monitoring of brakes in the vehicle. These can include mechanical components such as brake pads and/or drums, brake boosters, emergency brakes, a master cylinder, and a brake pedal. These can also include electrical components such as a wheel speed sensor and a brake pedal position sensor. Brake system 130 can also include suitable hardware and/or software modules such as an automated braking system (ABS) module.

Vehicle 100 can also include an onboard unit (OBU) 150. For clarity, a single OBU 150 is shown, but it may be appreciated that vehicle 100 can include multiple OBUs that monitor and/or control various different vehicle systems. Each OBU may comprise one or more processors as well as suitable memory components for storing instructions that can be executed by the processors.

Vehicle 100 can also include one or more communication systems 160. Communication systems 160 can include any suitable wireless networking components that facilitate communications over various wireless networks such as cellular networks, local area networks, Wi-Fi networks, personal area networks (such as Bluetooth networks), as well as Near Field Communication (NFC) networks. In some embodiments, communication systems 160 enable communication with user device 102, for example, via Wi-Fi, Bluetooth, or NFC communication.

In some embodiments, communication systems 160 enable communication with remote vehicles over a Vehicle-To-Vehicle (V2V) communication network. This allows vehicle 100 to exchange information with nearby vehicles, such as remote vehicle 106 and/or remote vehicle 108.

For purposes of clarity, each of the components of FIG. 1 are shown as communicating over a network 110. However, it may be appreciated that in some cases, different components could communicate over different networks.

Figure 2:
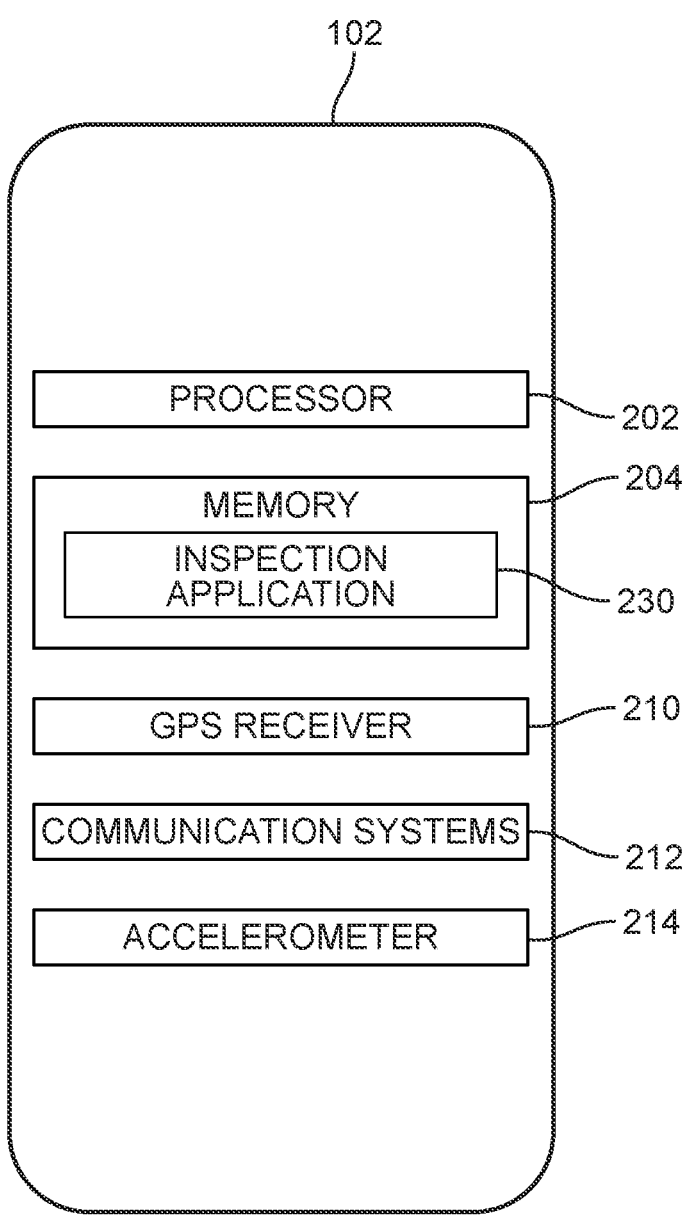
FIG. 2 is a schematic view of a user device, according to an embodiment.

User device 102, shown in more detail in FIG. 2, can be any suitable computing device for running an application that can perform one or more diagnostic tests and deliver the diagnostic information to inspection provider 104. Exemplary devices may include smart phones, tablet computing devices, wearable devices, laptop computers, or any other suitable computing systems. User device 102 may comprise at least one processor 202 and suitable memory 204 for storing instructions that can be executed by the at least one processor 202. User device 102 can also include a GPS receiver 210, communication systems 212 (for communicating via wide area networks, local area networks, personal area networks, and/or near field communications), and an accelerometer 214. Additionally, user device 102 can be equipped with any other suitable sensors, such as cameras and microphones. In an exemplary embodiment, user device 102 may be a cellphone.

User device 102 may store in memory 204, and run, safety inspection application 230 ("inspection application 230"). Inspection application 230 may include various modules for gathering inspection information, analyzing inspection information, and sending and/or receiving inspection information.

Vehicle 100 may be equipped with on-board diagnostics (OBD) capabilities. Onboard diagnostics can provide a wide range of sensed information about a vehicle that is gathered by one or more vehicle sensors. In some cases, to obtain diagnostic information from a vehicle's on-board diagnostics system, an interfacing device could be used to interface with on-board diagnostic ports in a vehicle. Exemplary interfaces include OBD-I, OBD-1.5, and OBD-II. Interfacing devices can comprise hand-held scan tools, mobile device-based tools, PC-based scan tools, data loggers and telematics devices. In one embodiment, user device 102 can communicate with an interfacing device that is further connected to an onboard diagnostics system 180 (or onboard diagnostics unit) to retrieve diagnostic information directly from systems aboard motor vehicle 100.

Vehicle 100 may also be equipped with a GPS receiver 170. This allows the precise GPS location of the vehicle to be determined and shared with relevant vehicle systems/modules.

Each of remote vehicle 106 and remote vehicle 108 may be any vehicles that can communicate with, and possibly provide information to, vehicle 100. Each of these remote vehicles could be provided with similar capabilities to vehicle 100. Moreover, in some cases, each remote vehicle may be equipped with cameras to capture images that are requested by a safety inspection application running on user device 102, as described in further detail below.

Figure 3:
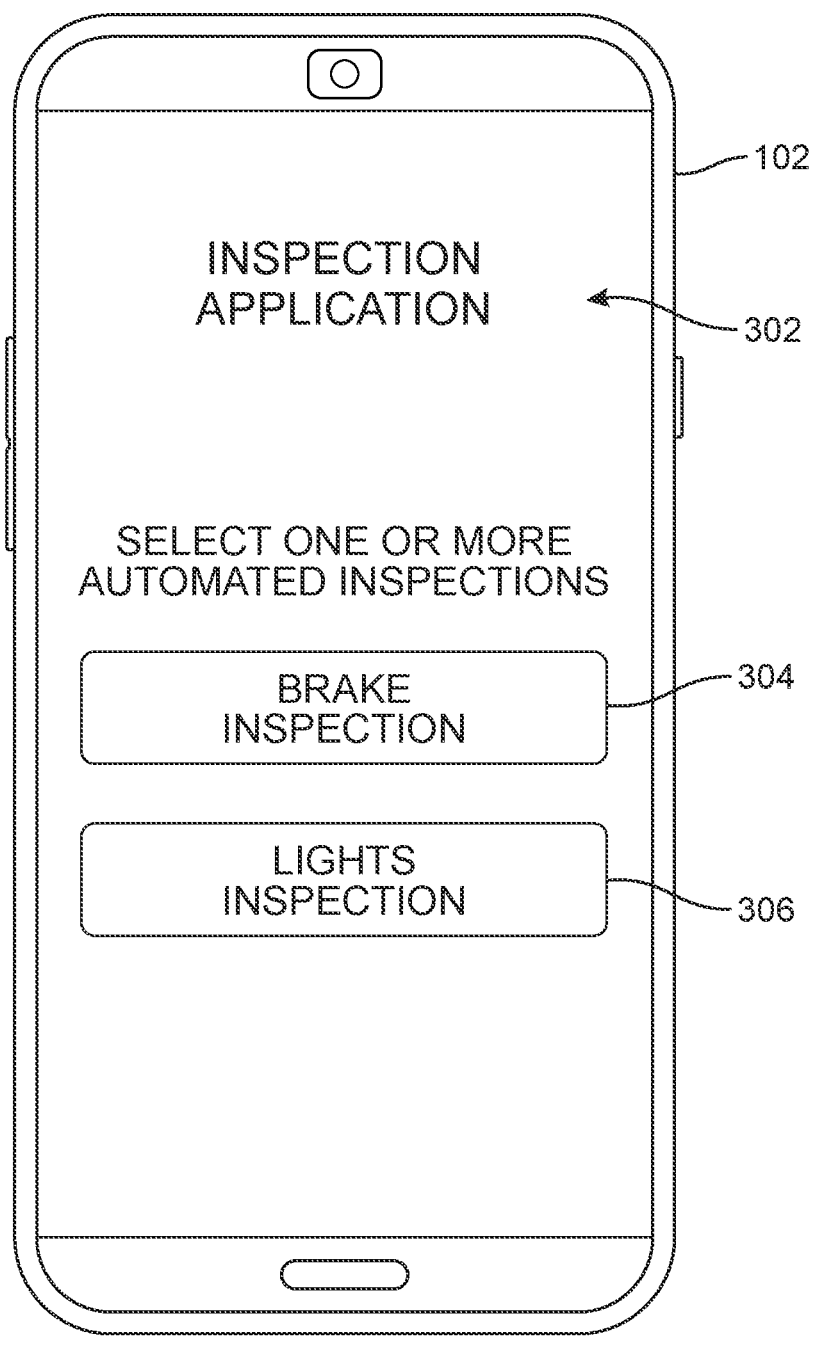
FIG. 3 is a schematic view of an inspection application running on a user device, according to an embodiment.

The exemplary system described above allows for the automated inspection of some systems of a motor vehicle. The process may be initiated when a user of a motor vehicle opens inspection application 230 on user device 102. An initial application view 302 is shown in FIG. 3. In this initial view 302, the user is provided the option for performing two different inspections. These include a brake inspection option 304 and a lights inspection option 306. Pressing brake inspection option 304 will automatically initiate the process for performing an inspection of the vehicle's brake system. Pressing lights inspection option 306 will automatically initiate the process for performing an inspection of one or more vehicle lights (such as headlights and taillights).

Once an inspection has been initiated, for example, via the menu shown in initial view 302, inspection application 230 may automatically determine a suitable inspection period for performing the inspection. As used herein, the term "inspection period" refers to a period of time when various data are retrieved, processed, and/or analyzed to determine an inspection status of a vehicle (or of a specific vehicle system). An inspection period need not be a continuous period and could include data from two segments of time that are separated by another intermediate segment of time. For example, testing a brake system may include monitoring acceleration and velocity data over multiple periods throughout a single day or over multiple days. Thus, the system may exclude data collected during various intermediate periods where the vehicle was operating under conditions that are not conducive to testing brakes. Moreover, the inspection period could be selected to optimize driver convenience, to optimize inspection accuracy, or some combination of both.

Figure 4:
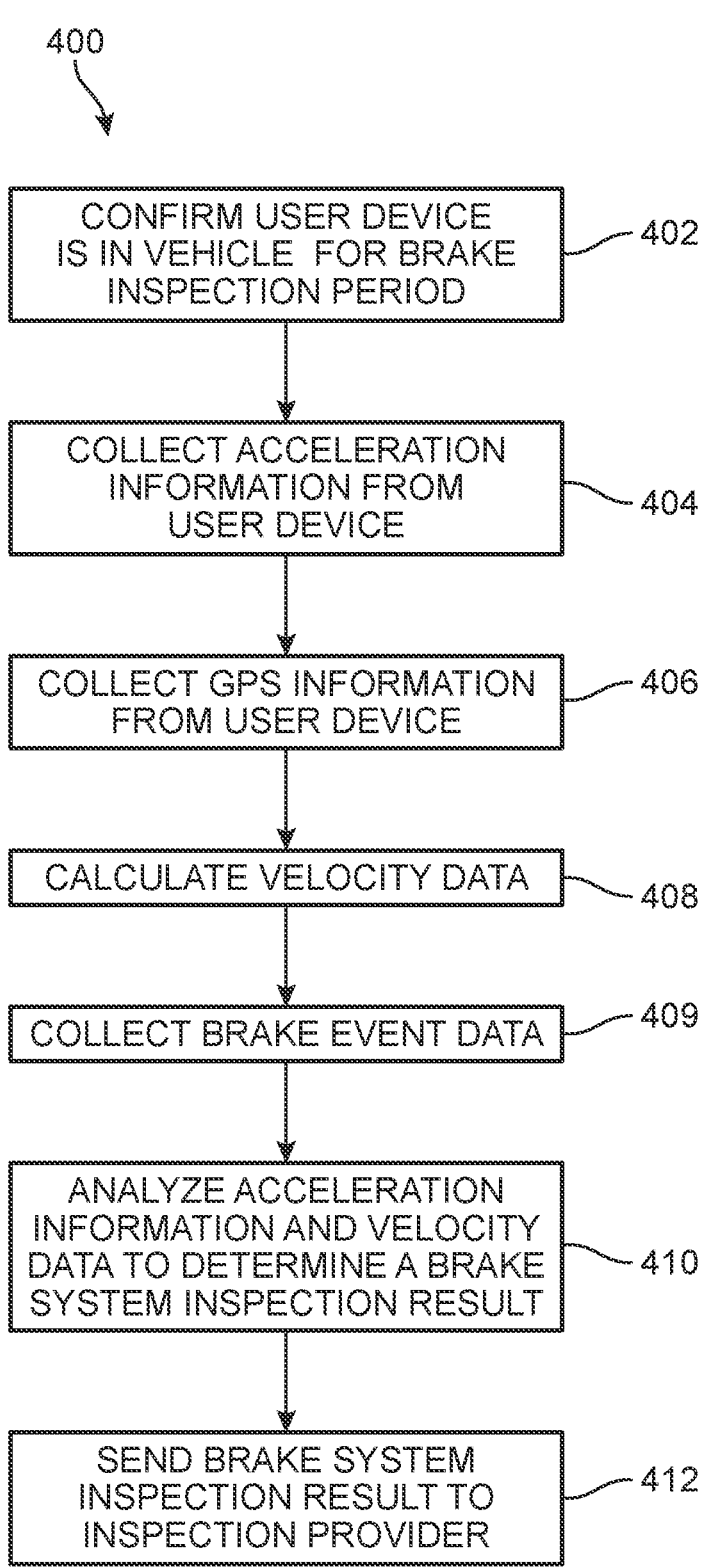
FIG. 4 is a schematic view of a process for inspecting a brake system, according to an embodiment.

FIG. 4 is a schematic view of a process 400 for performing a brake system safety inspection, according to an embodiment. In some embodiments, one or more of the following steps could be performed by an inspection application (such as inspection application 230) running on a user device.

In a first step 402, the application could confirm that the user device is disposed in the inspected vehicle during the brake inspection period. This may be done to ensure the integrity of the inspection process, since the user device may be used to directly sense some of the data that is gathered for the inspection. Moreover, the system may be understood to continuously check and confirm that the user device is operating within/on-board the motor vehicle during the brake inspection period, since any information gathered by the user device sensors while the user device is outside of the motor vehicle may not be useful for diagnostics of the motor vehicle. The process by which an application confirms that the user device is disposed within the inspected vehicle during the inspection period is described in further detail below.

In step 404, the application may collect acceleration information from an accelerometer of the user device. The data may specifically be collected during the brake inspection period. In step 406, the application may collect GPS information from a GPS receiver of the user device. The data may specifically be collected during the brake inspection period. Using at least the GPS information gathered in step 406, the application may calculate velocity data in step 408.

It may be appreciated that since the user device is disposed in the vehicle while data from its sensors/receivers are being collected, the acceleration data and velocity data provide a proxy for acceleration and velocity of the vehicle itself, so that this data can be used for inspecting the vehicle's brake system.

In some embodiments, braking behavior of the vehicle can be inferred from acceleration and velocity data alone. In other cases, it may be necessary to correlate some or all of the acceleration and velocity data with additional information including the times when the brakes are applied and/or the amount of braking force applied. Therefore, in some embodiments, in a step 409, the application can collect brake event data. Unlike acceleration and velocity data, which can be gathered from the user device, brake event data, including timestamped data indicating when and how much braking force is applied, must be gathered directly from the inspected vehicle. Specifically, the brake event data may be gathered from a device interfacing with the onboard diagnostics system (such as onboard diagnostics system 180). Using the additional brake event information may help the system distinguish between decelerations caused by the brakes being applied and decelerations due to, for example, collisions.

With the data gathered, the application proceeds to step 410, wherein the acceleration and velocity data can be analyzed to determine a brake system inspection result. In some cases, brake event data may also be analyzed as part of this step of determining a brake system inspection result. Details of this analysis are discussed in further detail below. It may be understood that this analysis may only be performed on data that was collected, or otherwise associated with, the brake inspection period.

The output of step 410 may be a PASS or FAIL result, or some other suitable classification of the performance of the brake system relative to one or more inspection metrics. The results may then be sent to an inspection provider in step 412. The inspection provider may use the results from the inspection application, possibly in combination with additional inspection results for other systems of the vehicle, to determine if the vehicle has passed or failed the vehicle inspection.

Conventional brake inspections for motor vehicles can include a combination of manual assessments of the brake pads, rotors, and other components, along with tests to measure a vehicle's stopping distance from an initial velocity when maximum brake pressure is applied. Such tests, however, may require the use of specialized equipment and/or procedures. By contrast, the proposed systems make use of machine learning to infer the status of brake system components, and test metrics such as stopping distance, based on at least acceleration and velocity information collected by an application running on a user device within a motor vehicle as it is operated by a user.

Figure 5:
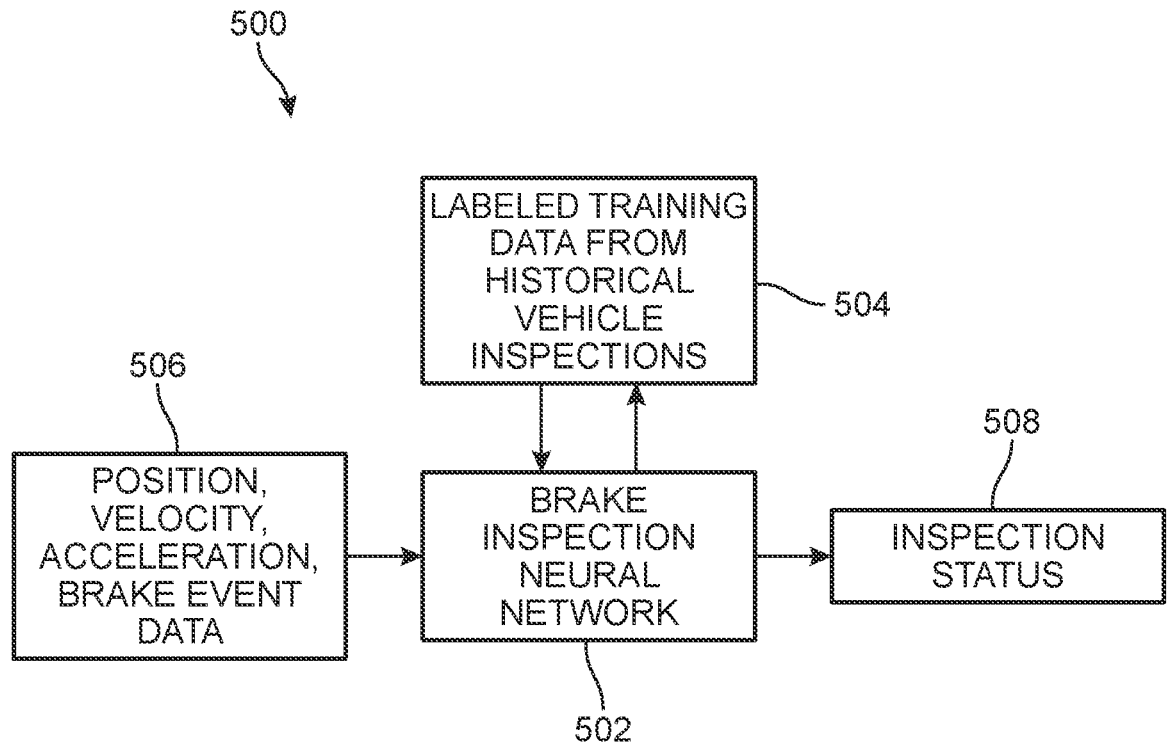
FIG. 5 is a schematic view of a brake inspection neural network, according to an embodiment.

In one embodiment, shown in FIG. 5, the machine learning model comprises a brake inspection neural network 502 ("neural network 502"). Neural network 502 may be trained on historical acceleration, position (that is, GPS position), velocity, and/or brake event information. Alternatively, in other embodiments, a similar neural network could be trained on any suitable sub combination of these inputs. Here, brake event information includes various information such as the brake pedal position, brake force applied, or other information that can be directly sensed about the brake system. When combined with acceleration and/or velocity information, brake event information can provide even more precise data that can be input into a model (such as neural network 502). For example, while acceleration information and/or velocity information can be used to infer that a user has applied the brakes at a given time, information about the state of the brake pedal position at that time can confirm that the sudden deceleration is due to braking and not, for example, a collision.

The exemplary neural network 502 can be trained using training data 504. Here, training data includes labeled data that not only has acceleration, GPS/position, velocity, and/or brake event data collected during a brake inspection period, but also includes the results of brake inspections conducted using conventional methods (for example, by an inspection provider). Thus, training neural network 502 on this labeled data allows the system to learn the complex relationship between acceleration, position, velocity, and/or brake event data and the health/inspection status of a brake system. Once neural network 502 has been trained on historical data, the system can predict an inspection status 508 (such as PASS or FAIL) from new vehicle data such as position, velocity, acceleration, and/or brake event data collected during a brake inspection period.

Figure 6:
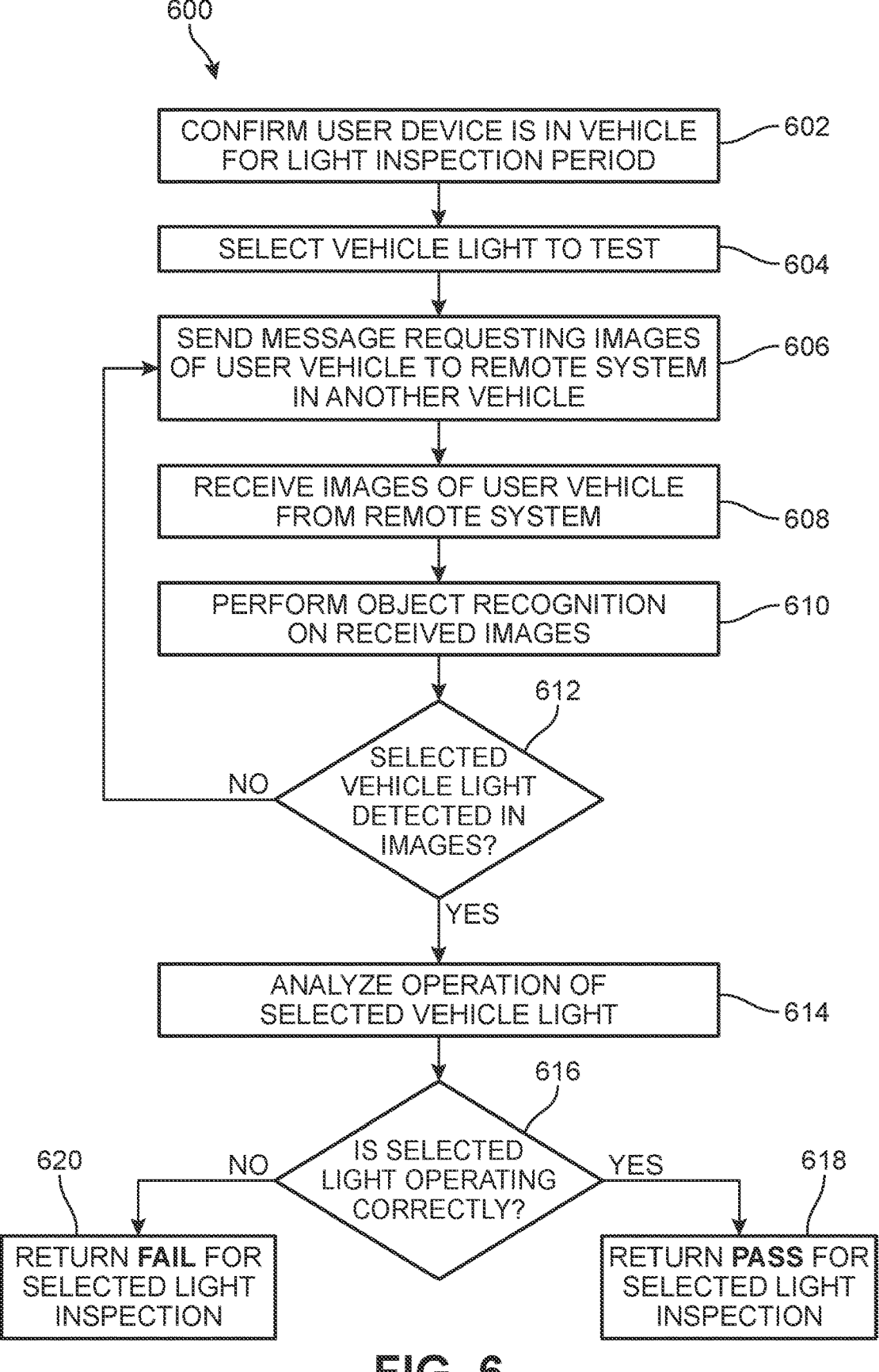
FIG. 6 is a schematic view of a process for inspecting vehicle lights, according to an embodiment.

FIG. 6 is a schematic view of a process for performing a safety inspection for one or more vehicle lights, according to an embodiment. In some embodiments, one or more of the following steps could be performed by an application running on a user device.

In a first step 602, the application could confirm that the user device is disposed in the vehicle. The process by which an application confirms that the user device is disposed within the motor vehicle to be inspected is described in further detail below.

More specifically, with respect to step 602, the application can confirm that the user device is disposed within the vehicle during a light inspection period. This may be done to ensure the integrity of the inspection process, since the user device may gather data from vehicles deemed to be nearby the inspected vehicle. If the user device is not located within the inspected vehicle during the inspection period, the user device may not find suitable nearby vehicles to capture images necessary to inspect the vehicle's lights. Moreover, the system may be understood to continuously check and confirm that the user device is operating within/on-board the motor vehicle during the light inspection period. The process by which an application confirms that the user device is disposed within the inspected vehicle during the inspection period is described in further detail below.

Following step 602, during step 604, the application can select a vehicle light to be tested. In some cases, for example, the application includes a predetermined list, stored in memory, of the different vehicle lights that need to be tested during an inspection. The application can automatically select a particular light to be tested first. While the exemplary embodiment describes a process of testing a single light at a time, in some cases, two or more lights could be tested simultaneously, such as both headlights or both brake lights.

With a particular light selected in step 604, the application proceeds to step 606. In step 606, the application can send a message to systems in one or more remote vehicles (such as remote vehicle 106 or remote vehicle 108 of FIG. 1). This message includes a request for the remote vehicle to capture one or more images of the inspected vehicle (that is, the vehicle where the user device is currently located). More specifically, the message can include a request for one or more images that would include the selected vehicle light. Because different lights are located in different locations on a vehicle, and because different remote vehicles may have different relative orientations and positions with respect to the inspected vehicle, some embodiments could include additional subprocesses for ensuring the requests are made to vehicles in good positions to take the desired images. An example of such a subprocess is discussed in further detail below and shown in FIG. 7.

In step 608, the application receives one or more images of the user vehicle including the selected light from the remote systems associated with one or more remote vehicles. In some cases, the application could receive video clips from remote vehicles comprising a sequence of images include the inspected vehicle.

Next, in step 610, the application may perform object recognition on the received images. Any suitable computer vision models for object recognition could be used. The models may be trained to recognize one or more types of vehicle lights within images of motor vehicles. Suitable models include, but are not limited to, Histogram of Oriented Gradients (HOG) feature extractor and Support Vector Machines (SVMs), bag of features models, the Viola-Jones algorithm, and Deep Learning models. Suitable Deep Learning models include convolutional neural networks (CNNs).

Using object recognition, the application can determine if the selected vehicle light is present in the received images. If the selected light has not been detected in step 612, the application may return to step 606 to request additional images of the inspected vehicle. If the selected light has been detected in step 612, the application may proceed to step 614.

In step 614, the application analyzes the images with the selected vehicle light to determine if the selected vehicle light is operating correctly. If the selected vehicle light is operating correctly in step 616, the application returns a "pass" or similar output for the inspection of the selected vehicle light in step 618. Otherwise, the application returns a "fail" or similar output for the inspection of the selected vehicle light in step 620.

After this process has been completed for a selected vehicle light, the application can return to step 604 and select a new light to test.

Different methods can be used to determine if a vehicle light is operating correctly. Each of these methods may utilize color information about the pixels in the captured image. As used herein, the term "color information" refers to suitably encoded information that determines each pixel's color, such as a suitable set of RGB (Red, green, blue) values, or, alternatively, using a suitable set of Hue/Saturation/Brightness values. Color information may also include an alpha value for each pixel in an image.

In one embodiment, color information about the pixels in the captured image could be compared to absolute color information values to determine if a selected vehicle light is illuminated. For example, to determine if a headlight is "on," as expected during the inspection, the application could identify the headlight within a captured image and then compare color information from the pixels of the headlight with threshold color values to determine if it is likely the headlight is actually illuminated or not. Because the threshold color values for determining if a light in an image is illuminated may vary with conditions such as time of day, the type of camera used, and the type of vehicle light, in some other cases a system could use a machine learning system that has been trained to classify vehicle lights in images as "on" or "off." For example, a suitably trained neural network could determine if a detected vehicle light in an image is on or off based on training data comprising a wide range of external light conditions, types of vehicle lights and type of camera capturing the images.

In other cases, rather than using an absolute threshold color value (such as a threshold for a certain amount of white and/or yellow and/or a certain level of brightness) for comparison, the application could use relative threshold color values based on relative color values of pixels throughout the whole image. Thus, for example, if pixels associated with the headlight are the "brightest" pixels in the image, it is likely that the headlight is on. As above, a suitably trained neural network or other machine learning system could also be used to predict whether a light in an image is on or off based only on relative color value differences throughout the same image.

In another embodiment, pixels in different images of the inspected vehicle could be compared. For example, to determine if an indicator light is flashing as expected, the application could compare images captured while the indicator light is on as well as images captured while the indicator light is off, and confirm that the color values change substantially between those two images. In such cases, the application could include instructions in messages to remote vehicles to capture sequences of images over a particular period to ensure that images of both the light being ON and of the light being OFF are captured. Similar processes could be used to determine if a headlight or taillight are working, by comparing images of the lights in states where they are supposed to be ON or OFF.

FIG. 7 is a schematic view of a process 700 for ensuring that appropriate images of the inspected vehicle are taken to determine if a selected vehicle light is operating correctly. In a first step 702, the application can establish communication with nearby vehicles (that is, remote vehicles that are also nearby). Next, in step 704, the application can retrieve information about the nearby vehicles including their locations, orientations and speeds. The application can also retrieve any information available about the imaging capabilities of the nearby vehicles. For example, the application could receive information indicating that a nearby vehicle directly in front of the inspected vehicle has a rearward facing camera with a wide-angle lens that would capture the entire front of the inspected vehicle within a particular range of distances.

In step 706, the application may determine a target remote vehicle with the best (camera) view of the selected vehicle light. In some cases, this can be done by building a rough 2D model of the inspected vehicle and the nearby vehicles to estimate their relative distances, speeds and (camera) viewing angles. If the selected vehicle light is a taillight, the application can automatically determine, from this internal 2D model, which nearby vehicle is in the best position to capture an image of the inspected vehicle that would include the taillight. In particular, the application would know to select on or more vehicles from the subset of all vehicles currently behind the inspected vehicle, since any nearby vehicles ahead of the inspected vehicle would be unable to view the taillight with a camera. The application would also know to rule out any vehicles that lack forward facing cameras.

Likewise, if the selected vehicle is a headlight, the application can automatically determine, from an internal 2D model, which nearby vehicle is in the best position to capture an image of the inspected vehicle that would include the headlight. In particular, the application would know to select on or more vehicles from the subset of all vehicles currently in front of the inspected vehicle, since any nearby vehicles behind the inspected vehicle would be unable to view the headlight with a camera. The application would also know to rule out any vehicles that lack rearward facing cameras.

Once a targeted nearby vehicle has been identified in step 706, the application proceeds to step 708. In step 708, the application sends a request for one or more images of the inspected vehicle to the target nearby vehicle.

As already discussed, data gathered for an inspection by a user device, such as a mobile phone, may only be considered to be valid so long as the user device is located within the vehicle during the inspection process. Otherwise, data gathered by any internal sensors of the user device may not be representative of conditions within the inspected vehicle. Likewise, data retrieved from "nearby vehicles" may not be useful since these vehicles may not actually be nearby the inspected vehicle when the user device is not co-located with the inspected vehicle. In some embodiments, confirming that a user device is located within a vehicle during an inspection process may include retrieving GPS location information from both the user device and the inspected vehicle (that is, from their respective GPS receivers). The GPS locations can then be compared and a suitable analysis used to confirm that the data is consistent with co-location of the user device with the inspected vehicle during the inspection process.

In other embodiments, other methods could be used to confirm that a user device is located within a vehicle during an inspection period.

FIG. 8 is a schematic view of a process 800 for ensuring that a user device is disposed within an inspected vehicle throughout the duration of an inspection (that is, throughout the entirety of the inspection period). Starting in step 802, the application can establish communication with an onboard unit of the inspected vehicle over a suitable short-range network. Specifically, the communication may occur over networks whose range does not extend substantially outside of the footprint of a motor vehicle. Exemplary networks could include personal area networks, such as Bluetooth networks, and Near Field Communication networks. By using a suitably ranged network, the system can be sure that the user device is within the inspected vehicle whenever the user device is in communication with systems onboard of the inspected vehicle.

In general, the application may communicate with any suitable onboard unit. In some cases, the communication may facilitate part of the inspection process, or provide some other utility. In other cases, the content of the communication may not be relevant, and only the fact that the application can communicate with the onboard unit matters for confirming co-location.

Throughout the inspection period, the application can continue to monitor communication with the inspected vehicle over the short-range network as in step 804. As long as the application can still communicate with the onboard system over the selected short-range network, it may be assumed that the user device is co-located with the inspected vehicle, especially if one or both are moving.

If communication is maintained throughout the inspection period, the application can confirm that the inspection data is valid, as in step 806. Otherwise, if communication is broken for any significant period of time, the application concludes that the user device may have been located outside of the inspected vehicle for some of the inspection period. In that case, the application determines that the inspection data is invalid, as in step 808.

The validity of the data may be used to determine which parts of any data captured by the user device can be used for inspection purposes. If some or all of the data is determined to be invalid, the application may require the user to restart the inspection process.

Figure 9:
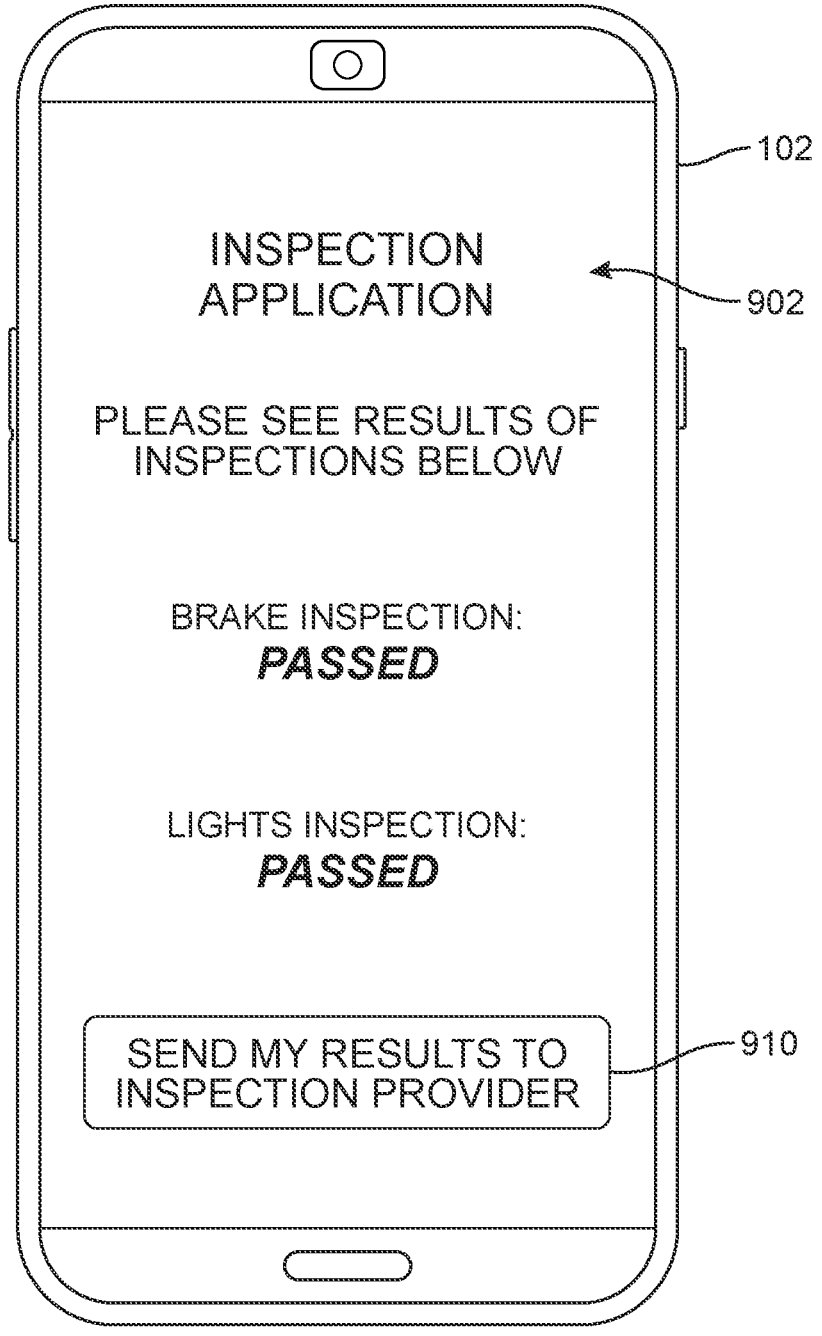
FIG. 9 is a schematic view of an inspection application running on a user device, according to an embodiment.

After each inspection is performed, the results may be displayed for the user, as in FIG. 9. Here, view 902 shows a user that both the brake inspection and the lights inspection have PASSED. The user is given a further option to send these results to their inspection provider using submission button 910.

The exemplary systems and methods may allow inspections for some vehicle systems to be performed in any suitable locations. Moreover, results of these inspections can be used in combination with other inspections that must be performed by an inspection provider. For example, if a user selects to have their inspection results sent to the inspection provider, upon arriving at the inspection station the provider can confirm which systems have already passed inspection and which still need to be tested.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of inspecting brakes and lights in a motor vehicle using an application running on a mobile device, comprising:

receiving continuous GPS data from a GPS receiver of the mobile device;

determining a safety inspection period for gathering brake inspection data;

receiving a selected vehicle light from a set of vehicle lights;

calculating continuous velocity data from the GPS data during the safety inspection period;

receiving, during the safety inspection period, acceleration data from an accelerometer of the mobile device;

establishing communication with a plurality of remote systems in a plurality of remote vehicles;

retrieving information from the plurality of remote systems about the plurality of remote vehicles;

modeling relative positions, speeds, and camera viewing angles of the plurality of remote vehicles using the retrieved information and selecting, among the plurality of remote vehicles, a target remote vehicle with a best camera view of the selected light;

sending a message to the remote system in the target remote vehicle during the safety inspection period, wherein the message includes a request to capture an image of the motor vehicle including the selected vehicle light using a camera of the remote vehicle;

receiving, during the safety inspection period, the requested image of the motor vehicle from the remote system in the target remote vehicle;

analyzing the requested image using object recognition to identify the selected vehicle light of the motor vehicle;

determining that data gathered during the safety inspection period is valid by continuously checking that the mobile device is co-located within the motor vehicle during the safety inspection period; and analyzing, using a machine learning model, the continuous velocity data and the acceleration data to determine a braking safety inspection result; and wherein if the selected vehicle light is identified, the method further includes determining if the selected vehicle light can be illuminated.

2. The method according to claim 1, wherein the method further comprises communicating with an onboard computing system of the motor vehicle and receiving braking information from the onboard computing system, and using the braking information as input to the machine learning model.

3. The method according to claim 2, wherein the braking information includes brake pedal position information.

4. The method according to claim 1, wherein the method further includes:

receiving a continuous vehicle GPS location from an onboard computing system of the motor vehicle;

and wherein checking that the mobile device is co-located within the motor vehicle during the safety inspection period comprises comparing the continuous GPS data from the mobile device with the continuous vehicle GPS location from the motor vehicle.

5. The method according to claim 1, wherein checking that the mobile device is co-located within the motor vehicle during the safety inspection period further includes communicating with an onboard computing system of the motor vehicle using a personal area network.

6. The method according to claim 1, wherein checking that the mobile device is co-located within the motor vehicle during the safety inspection period further includes communicating with an onboard computing system of the motor vehicle using near field communication.

7. The method according to claim 1, wherein the method further includes:

determining a second safety inspection period for gathering brake inspection data; and determining that data gathered during the safety inspection period is invalid by determining that the mobile device is not located within the motor vehicle at some point during the safety inspection period.

8. A method of inspecting lights in a motor vehicle using an application running on a mobile device, comprising:

receiving a selected vehicle light from a set of vehicle lights;

determining a safety inspection period for gathering light inspection data;

establishing communication with a plurality of remote systems in a plurality of remote vehicles;

retrieving information from the plurality of remote systems about the plurality of remote vehicles;

modeling relative positions, speeds, and camera viewing angles of the plurality of remote vehicles using the retrieved information and selecting, among the plurality of remote vehicles, a target remote vehicle with a best camera view of the selected light;

sending a message to the remote system in the target remote vehicle during the safety inspection period, wherein the message includes a request to capture an image of the motor vehicle including the selected vehicle light using a camera of the remote vehicle;

receiving, during the safety inspection period, the requested image of the motor vehicle from the remote system in the target remote vehicle;

analyzing the requested image using object recognition to identify the selected vehicle light of the motor vehicle; and wherein if the selected vehicle light is identified, the method further includes determining if the selected vehicle light can be illuminated.

9. The method according to claim 8, wherein determining if the selected vehicle light can be illuminated further comprises determining a brightness of pixels in the image corresponding to the selected vehicle light.

10. The method according to claim 8, wherein determining if the selected vehicle light can be illuminated further comprises comparing the brightness of the pixels in the image with a brightness of pixels in a reference image.

11. The method according to claim 8, wherein determining if the selected vehicle light can be illuminated further comprises using a neural network to classify the selected vehicle light in the requested image as on or off.

12. The method according to claim 8, wherein the selected vehicle light is a taillight.

13. The method according to claim 8, wherein the selected vehicle light is a headlight.

14. The method according to claim 8, wherein the selected vehicle light is an indicator light.

15. The method according to claim 8, wherein the method further includes determining that data gathered during the safety inspection period is valid by continuously checking that the mobile device is co-located within the motor vehicle during the safety inspection period.

16. A system for inspecting lights in a motor vehicle using an application running on a mobile device, the system comprising:

a processor and non-transitory computer-readable media for storing instructions, wherein the instructions are executable by the processor to:

receive a selected vehicle light from a set of vehicle lights;

determine a safety inspection period for gathering light inspection data;

establishing communication with a plurality of remote systems in a plurality of remote vehicles;

retrieving information from the plurality of remote systems about the plurality of remote vehicles;

modeling relative positions, speeds, and camera viewing angles of the plurality of remote vehicles using the retrieved information and selecting, among the plurality of remote vehicles, a target remote vehicle with a best camera view of the selected light;

send a message to the remote system in the target remote vehicle during the safety inspection period, wherein the message includes a request to capture an image of the motor vehicle including the selected vehicle light using a camera of the remote vehicle;

receive, during the safety inspection period, the requested image of the motor vehicle from the remote system in the target remote vehicle; and analyze the requested image using object recognition to identify the selected vehicle light of the motor vehicle;

wherein if the selected vehicle light is identified, the instructions are further executable to determine if the selected vehicle light can be illuminated.

17. The system according to claim 16, wherein using object recognition includes using a neural network.

18. The system according to claim 16, wherein the instructions are further executable to determine if the selected vehicle light passes the inspection.

19. The system according to claim 18, wherein the instructions are further executable to determine that data gathered during the safety inspection period is valid by continuously checking that the mobile device is co-located within the motor vehicle during the safety inspection period.

20. The system according to claim 18, wherein the instructions are further executable to determine a target nearby vehicle with a best view of the selected vehicle light.

*   *   *   *   *